United States Patent [19]
Kessler

[11] Patent Number: 5,255,114
[45] Date of Patent: Oct. 19, 1993

[54] HIGH RESOLUTION SCANNER
[75] Inventor: David Kessler, Rochester, N.Y.
[73] Assignee: Eastman Kodak Company, Rochester, N.Y.
[21] Appl. No.: 18,123
[22] Filed: Feb. 16, 1993

Related U.S. Application Data

[62] Division of Ser. No. 790,887, Nov. 12, 1991, Pat. No. 5,221,975.

[51] Int. Cl.⁵ .............................................. G02B 26/08
[52] U.S. Cl. ................................... 359/196; 359/208; 250/235; 358/474
[58] Field of Search ............... 359/196, 197, 208, 209, 359/211, 213, 216, 217, 218, 219, 220, 221; 250/234, 235, 236; 358/474, 296

[56] References Cited

U.S. PATENT DOCUMENTS 3,748,015 7/1973 Offner ................................. 359/366
3,752,559 8/1973 Fletcher et al. .................... 359/366
5,013,108 5/1991 Van Amstel ........................ 359/208
5,103,091 4/1992 Hirose et al. ....................... 250/235
5,122,658 6/1992 Ando ................................... 250/235
5,136,413 8/1992 MacDonald et al. .............. 359/213

Primary Examiner—Loha Ben
Attorney, Agent, or Firm—Robert L. Randall

[57] ABSTRACT

A high resolution scanner is disclosed which is adapted to digitally record an image from photographic film. The scanner comprises a folded integrating sphere which projects illumination on the film as the film is moved relative to the integrating sphere. Light transmitted through the film is directed to a photodetector by an optical system. In order to produce an aberration-free image on the photodetector, the illumination projected on the film is in the form of an arc, and a unit magnification optical system transmits light to a photodetector having image sensor elements arranged in an arc.

1 Claim, 3 Drawing Sheets

HIGH RESOLUTION SCANNER

This is a divisional of application Ser. No. 790,887 filed Nov. 12, 1991 now U.S. Pat. No. 5,221,975.

BACKGROUND OF THE INVENTION

1. Field of the Invention

This invention relates to a high resolution scanner, and more particularly, to such a scanner which is particularly suitable for scanning photographic film.

2. Description of the Prior Art

In certain types of scanners for digitally recording an image from photographic film, the film is advanced relative to an illumination source which is adapted to provide a line of illumination on the film. Light transmitted through the film is imaged onto a photodetector such as a charge-coupled device (CCD). One of the main problems in such scanners is in projecting an image without aberrations on the photodetector so that the recorded image will be a true representation of the image on the film.

U.S. Pat. No. 4,467,361, is directed to one approach for producing an aberration-free image on an image sensor. This patent discloses an image pick-up apparatus which includes a solid state image sensor having a number of image sensing elements and an objective lens for projecting an image of the object onto the image sensor. In order to correct aberrations of the optical system, particularly curvature of field, the image sensor is curved into a spherical shape having a radius of curvature equal to that of the curvature of field. A problem with this arrangement is that such an image sensor is very difficult to manufacture. A further problem is that it is difficult to accommodate different image sizes in this type of image sensor.

In U.S. Pat. No. 4,843,481, there is disclosed CCD scanning apparatus for use with a rotary head printer. This apparatus comprises an area image sensor in which the image sensor elements are arranged in rows having a curvature. Data recorded by the image sensor is printed on a rotary head printer which produces a scan line having the same curvature as the image sensor elements, and thus, the data from the image sensor can be directed to the printer without additional processing. A disadvantage of the scanning apparatus disclosed in this patent is that the optical system used with the scanner would not produce an aberration-free image on the image sensor, and thus, the scanner would not be suitable for applications requiring high resolution images. Further, the area image sensor could not be used for the highspeed scanning of a continuously moving web such as film.

The patent to Offner, U.S. Pat. No. 3,748,015, discloses an optical system for forming an image of an object at unit magnification. The system incorporates a convex mirror and a concave mirror arranged with their centers of curvature coinciding at a point. Such an optical system provides a substantially distortion-free image. However, there is no provision in this patent for digitally recording an image produced by the optical system.

SUMMARY OF THE INVENTION

It is an object of the present invention to overcome the problems in the prior art discussed above and to provide an improved high resolution scanner.

In accordance with the present invention there is provided a scanner comprising: illumination means for producing radiation on an arcuate area of a receiving medium; means for producing relative movement between the illumination means and the receiving medium in order to scan successive arcuate areas of the receiving medium; detection means for receiving radiation from the receiving medium and for producing an electrical signal representative of an image on the receiving medium; and optical means for producing an image of the arcuate area on the receiving medium in an arcuate area on the detection means, the arcuate areas on the detection means and receiving medium being generally the same size.

In one embodiment of the present invention, an illumination means in the form of an integrating sphere is adapted to irradiate an arcuate area on a receiving medium such as a film. Light transmitted through the film is directed to a first concave mirror by means of a trapezoidal prism. The concave mirror directs the light to a convex mirror which directs the light back to the concave mirror. Light from the concave mirror is transmitted to the prism which directs the light onto a CCD image sensor. The light is directed onto an arcuate area of the image sensor, and the image sensor elements are arranged in the form of an arc. The optical system forms an image at unit magnification on the image sensor.

A principal advantage of the present invention is that it provides a high resolution scanner which is extremely fast. A further advantage is that the optical elements used in the present invention are relatively inexpensive to manufacture, and as a result, the optical system in the disclosed scanner is less expensive than systems for high resolution scanners which use refractive lenses. The optical system in the present invention has an advantage over other unit magnification systems, such as contact CCD scanners, since it provides a large working distance and means for controlling scattered light.

Other features and advantages will become apparent upon reference to the following description of the preferred embodiment, when read in light of the attached drawings.

DESCRIPTION OF THE PREFERRED EMBODIMENTS

Figure 1:
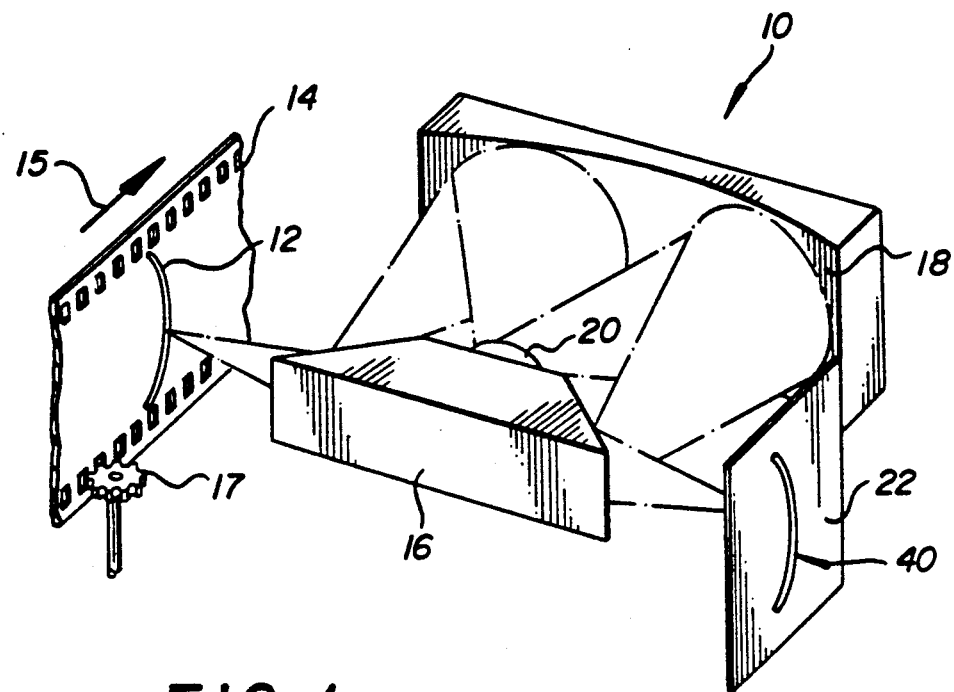
FIG. 1 is a perspective view of the high resolution scanner of the present invention.

With reference to FIG. 1, there is shown a scanner 10 constructed in accordance with the present invention. In scanner 10, an arcuate area 12 is illuminated on a receiving medium such as a film 14. The film is moved relative to the area 12 in the direction of arrow 15 by means of a sprocket drive indicated schematically at 17. Light transmitted through film 14 is directed to an optical system which includes a trapezoidal prism 16. Prism 16 directs the light to a concave mirror 18. From concave mirror 18, light is reflected to a convex mirror 20 which directs the light back to mirror 18. From concave mirror 18 the light is directed to prism 16 which transmits the light to a photodetector 22.

Figure 2:
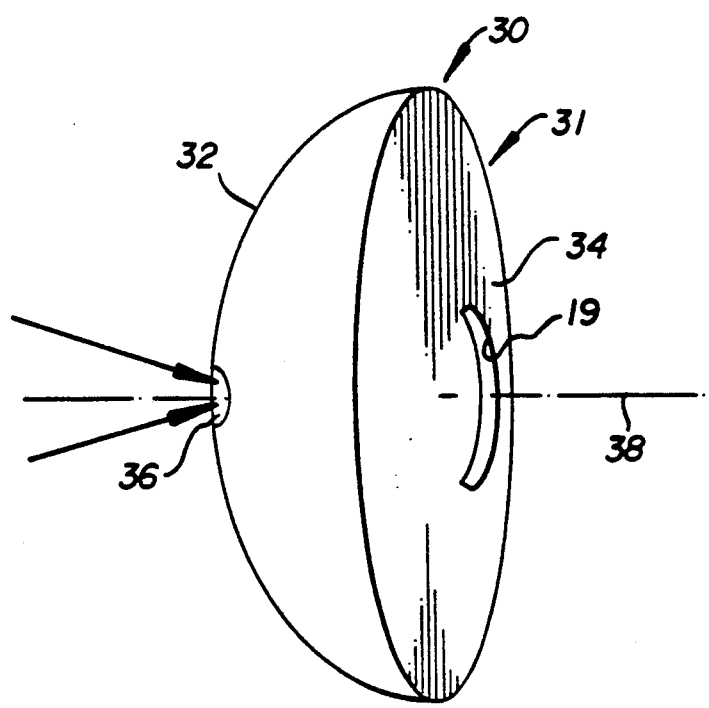
FIG. 2 is a perspective view of the illumination system used in the scanner shown in FIG. 1.
Figure 4:
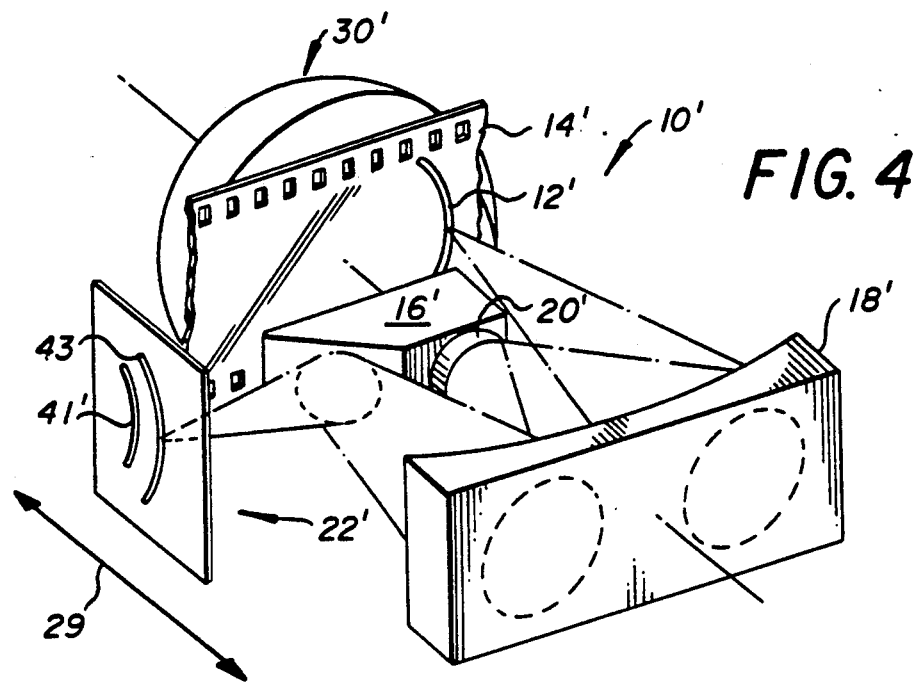
FIG. 4 is a perspective view of a second embodiment of the present invention.

An illumination system 30 for use in scanner 10 is shown in FIG. 2. Illumination system 30 comprises a folded integrating sphere 31 which includes a hollow hemispherical section 32 having a reflective or diffusely reflective surface on the interior wall (not shown) and a planar mirror 34 joined to section 32. Light is provided to integrating sphere 31 through an opening 36 in section 32 which is disposed along an axis 38. Light is emitted from integrating sphere 30 through a slit 19 shaped in the form of an arc in the planar mirror 34. The light from slit 19 irradiates the arcuate area 12 on film 14. A suitable light source for illumination system 30 can be, for example, a xenon arc lamp. The illumination system 30 is mounted closely adjacent the film 14 in scanner 10, as shown in scanner 10' (FIG. 4).

Figure 6:
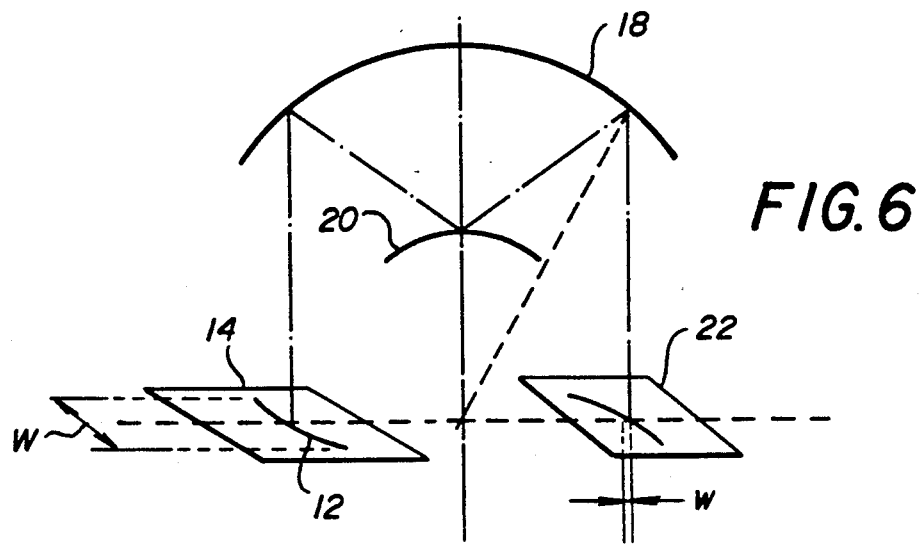
FIG. 6 is a schematic representation of the optical path in the present invention.

In one illustrative example of the present invention, the optical elements are selected to provide an F/3 effective system. In this system, concave mirror 18 has a radius of curvature of 80 mm, and a clear aperture diameter of 63 mm. Convex mirror 20 has a radius of curvature of 40 mm, one-half that of mirror 20, and a clear aperture diameter of 13.3 mm. The separation between the mirrors 18 and 20 is 38.9474 mm and the distance, as measured along the optical axis, from the object plane (at film 14) to concave mirror 18 is 80.97 mm. The best image height for a film of the 25 mm format occurs at 18.05 mm from the axis. The object (at film 14) and image (at photodetector 22) are on an arc formed about a radius of 18.05 mm. The sag over the 25 mm format is 5.05 mm. In scanning film of the 25 mm format, the arcuate area 12 on the film 14 extends for a linear distance W equal to 25 mm (FIG. 6), and the field width w (FIG. 6) at the photodetector 22 is 0.69 mm for diffraction limited imaging. The residual aberrations are 0.01 waves.

Figure 5:
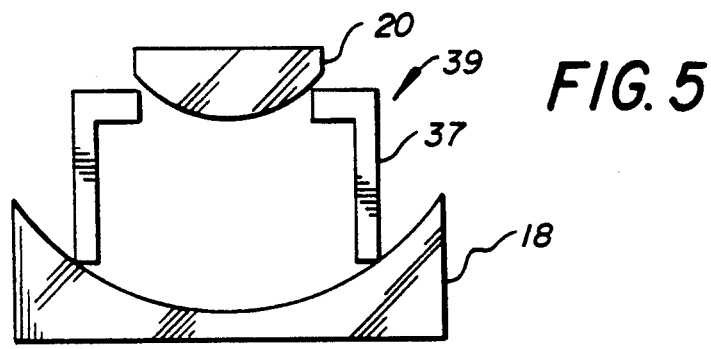
FIG. 5 is a plan view of a mounting arrangement for the mirrors in the present invention.

The disclosed optical system is relatively inexpensive to manufacture since the mirrors 18 and 20 can be made by conventional methods such as by grinding and polishing, by diamond turning, or by replication. As shown in FIG. 5, mirrors 18 and 20 can be easily mounted on a barrel 37 to form a drop-in unit 39.

Figure 3A:
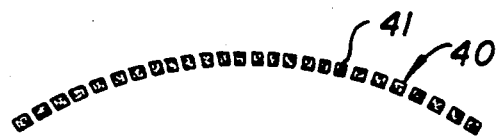
FIGS. 3a–3g are plan views of various configurations of image sensor elements for the image sensor used in the present invention.
Figure 3B:
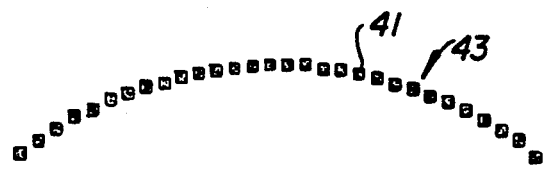
Figure 3C:
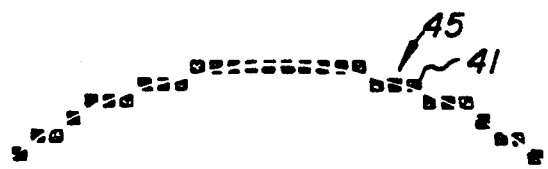

Photodetector 22 preferably includes a CCD image sensor 40, as shown in FIG. 3a, which includes a plurality of image sensor elements 41 arranged to conform to an arcuate area of the same size as the arcuate area 12 on film 14. Thus, for the example given above, the image sensor elements should fit within an arc whose radius is 18.05 mm and whose thickness is 0.69 mm (for diffraction limited performance). As a result of arranging the image sensor elements in a curved pattern, the serial transfer of pixel voltage values from the image sensor and the conversion thereof to a composite modulated signal can occur without special processing and without loss of printed image resolution. In such a system, the image information will always be kept in this curved coordinate form. Thus, for display on a CRT, the raster lines could also be curved by controlling the deflection coil voltages.

In the printing of an image from digital information collected by scanner 10, a monocentric printer (not shown) can be used, such as the printer shown in U.S. Pat. No. 4,759,593, granted in the name of Kessler and assigned to the assignee of the present invention. The printer disclosed in this patent develops a series of record tracks on a print medium, each of the record tracks defining a predetermined curve. In the use of scanner 10 to supply a composite modulated signal to such a printer, the image sensor in scanner 10 would have image sensor elements which lie on a curve that is geometrically proportional to the predetermined curve of the printer record track. The analog voltage values of the pixels are serially transferred, row by row, to signal processing circuitry (not shown). When the pixel values are transferred from the signal processing circuitry to the printer as a composite modulated signal, the image resulting from the successive record tracks on the medium will be a true reproduction of the image seen by the photodetector.

In some applications, there will be a need for the scanned information to be converted to a rectilinear coordinate system. To accomplish this, an image algorithm can be used in a well-known manner to "straighten" the information supplied by the curved CCD array.

Figure 3D:
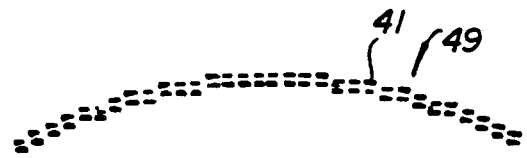
Figure 3E:
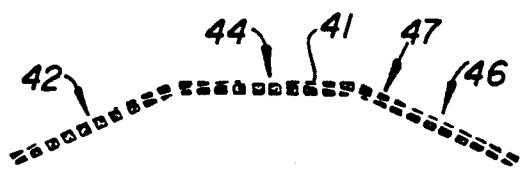
Figure 3F:
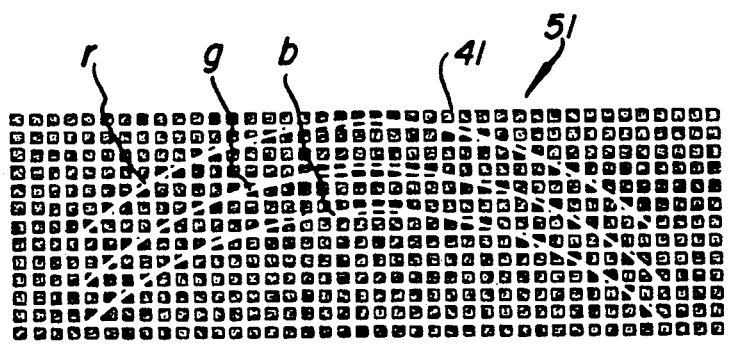
Figure 3G:

Different configurations of curved image sensors for use in detector 22 are shown in FIGS. 3b–3g. From an optical point of view, image sensors 40 and 43, shown in FIGS. 3a and 3b, respectively, are the most desirable. In image sensor 45, shown in FIG. 3c, the image sensor elements 41 are arranged in a rectangular grid and are placed to encompass a curved line by displacing the elements in a cross-scan direction by no more than one pixel width. Such an arrangement will simplify data transformation to rectilinear coordinates. A variation of the configuration of image sensor 45 is shown in FIG. 3d where the elements 41 of an image sensor 49 are displaced by one-half of a pixel width in a cross-scan direction. It is also possible to approximate a curved line by using linear segments as shown in image sensor 47 (FIG. 3e) which includes three linear segments 42, 44, and 46. In FIG. 3f, different image sensor elements 41 in a rectangular array 51 are assigned to three curved lines r, g, and b for registering, for example, a red, green, and blue representation of each scan line. It will be understood that each of the configurations shown in FIGS. 3a–3e can be used in a color scanner in which an arcuate CCD is used for each of the primary colors. For example, FIG. 3g shows three image sensors 43 arranged to sense the three primary colors.

In some applications, such as telecine applications, it is necessary to scan different formats of 35 mm motion picture film. It is possible in scanner 10, which has a unit magnification, or 1:1, optical system, to accommodate different formats by using an image sensor sized for the largest format; when doing a smaller format with such an image sensor, certain of the pixels would be ignored. It would also be possible to have an arrangement as shown FIG. 4. In FIG. 4, there is shown a high resolution scanner 10' constructed in accordance with a second embodiment of the present invention. Scanner 10' comprises an illumination system 30' which irradiates an arcuate area 12' on a film 14'. The light transmitted through the film 14' is reflected by a concave mirror 18' to a convex mirror 20' which directs the light back to mirror 18'. From mirror 18', light is directed to a trapezoidal prism 16' which transmits the light to photodetector 22'. Photodetector 22 comprises two image sensors 40' and 43 formed on a substrate 22'. The two image sensors 40' and 43 are spaced apart such that it would be possible to switch from one image sensor to the other image sensor by either moving the photodetector 22', as indicated by the double-headed arrow 29 in FIG. 4, or by moving the prism 16' and refocusing on the photodetector 22'.

The invention has been described in detail with particular reference to the preferred embodiments thereof, but it will be understood that variations and modifications can be effected within the spirit and scope of the invention. For example, although the scanner 10 has been described herein as operating in a transmittance mode, it will be apparent that the scanner could operate in a reflection mode to scan other webs of material, such as paper, having information recorded thereon.

I claim:

1. A scanner comprising:

illumination means for irradiating a receiving medium having an image thereon;

means for producing relative movement between said illumination means and said receiving medium;

detection means for receiving radiation from said receiving medium and for producing an electrical signal representative of the image on said receiving medium; and optical means disposed in an optical path between said receiving medium and said detection means for forming an image on said detection means which is the same size as the image on said receiving medium, said optical means including a convex mirror and a concave mirror.

* * * * *